(12) United States Patent
Summers

(10) Patent No.: US 11,485,441 B2
(45) Date of Patent: Nov. 1, 2022

(54) HELMET LOCKING ASSEMBLY

(71) Applicant: Darwin Summers, Elk Grove, CA (US)

(72) Inventor: Darwin Summers, Elk Grove, CA (US)

( * ) Notice: Subject to any disclaimer, the term of this patent is extended or adjusted under 35 U.S.C. 154(b) by 543 days.

(21) Appl. No.: 16/660,967

(22) Filed: Oct. 23, 2019

(65) Prior Publication Data
US 2021/0122436 A1  Apr. 29, 2021

(51) Int. Cl.
*B62J 11/24* (2020.01)
*A42B 3/04* (2006.01)

(52) U.S. Cl.
CPC ............ *B62J 11/24* (2020.02); *A42B 3/0413* (2013.01)

(58) Field of Classification Search
CPC .... B62H 5/001; B62H 5/04; B62H 2005/008; B62J 11/24; B62J 11/22; B62J 6/027; B62J 6/03; B62J 6/045; B62J 6/04; B62J 6/056

See application file for complete search history.

(56) References Cited

U.S. PATENT DOCUMENTS

| | | | | |
|---|---|---|---|---|
| 1,030,844 A | * | 6/1912 | Howell ...................... | B62J 7/04 224/415 |
| 3,529,451 A | * | 9/1970 | McOsker ................. | B62J 11/24 70/59 |
| 3,581,531 A | * | 6/1971 | Hediger ................... | B62J 11/24 70/59 |
| 3,625,405 A | * | 12/1971 | Kezar ....................... | B62J 1/28 224/450 |
| 3,759,072 A | * | 9/1973 | McLarnon ............ | E05B 65/467 70/59 |
| 3,805,565 A | | 4/1974 | McLamon | |
| 3,882,700 A | * | 5/1975 | Dunlap ..................... | B62J 11/24 70/59 |
| 3,896,643 A | * | 7/1975 | Kawakami ............... | B62J 11/24 70/59 |
| 4,096,980 A | * | 6/1978 | Clow ........................ | B62J 9/27 224/430 |
| 4,274,271 A | * | 6/1981 | Todd ........................ | B62J 11/24 70/59 |
| 4,567,740 A | * | 2/1986 | Kelly ...................... | E05B 67/38 70/55 |
| 4,733,805 A | * | 3/1988 | Sawada .................... | B62J 11/24 224/539 |
| 4,766,616 A | | 8/1988 | Donahue | |
| 5,226,341 A | * | 7/1993 | Shores ................. | B62K 21/125 74/551.8 |
| D367,179 S | | 2/1996 | Denissen | |
| 5,546,776 A | * | 8/1996 | Sun ......................... | E05B 67/38 70/DIG. 49 |

(Continued)

FOREIGN PATENT DOCUMENTS

WO   WO-2021188338 A1 *  9/2021 ............. B62J 6/015

*Primary Examiner* — Jillian K Pierorazio

(57) ABSTRACT

A helmet locking assembly for securely storing motorcycle helmets on a motorcycle includes a mounting unit that is coupled to a motorcycle. A pair of locking units is each coupled to the mounting unit. Each of the locking units releasably engages a respective one of a plurality of motorcycle helmets for retaining the motorcycle helmets on the motorcycle. A pair of turn signals is coupled to the mounting unit. Each of the turn signals is turned on when respective ones of the motorcycle turn indicators is turned on. A plurality of light emitters is coupled to the mounting unit. Each of the light emitters is turned on when tail lights or brake lights of the motorcycle are turned on.

10 Claims, 8 Drawing Sheets

(56) References Cited

U.S. PATENT DOCUMENTS

| | | | | |
|---|---|---|---|---|
| 5,950,891 A * | 9/1999 | Brungardt | B60R 9/06 224/924 |
| 6,116,064 A | 9/2000 | Driscoll | |
| 6,415,635 B1 * | 7/2002 | Jonasson | B62J 11/24 70/59 |
| 6,698,257 B2 | 3/2004 | Kulas | |
| 7,159,423 B1 | 1/2007 | Mrdeza | |
| 7,661,280 B1 * | 2/2010 | Weyland | B62H 5/003 70/30 |
| 8,499,989 B1 * | 8/2013 | Ory | B62J 7/04 224/423 |
| 9,999,271 B2 | 6/2018 | Reda | |
| 10,711,987 B1 * | 7/2020 | Ho | B60Q 1/38 |
| 2003/0173386 A1 * | 9/2003 | Scaccia | B62J 11/24 224/427 |
| 2003/0226383 A1 * | 12/2003 | Kulas | B62H 5/02 70/59 |
| 2007/0044586 A1 * | 3/2007 | Ishikawa | B62J 6/03 74/551.8 |
| 2011/0049205 A1 * | 3/2011 | Laperle | B62J 9/27 224/419 |
| 2011/0169409 A1 * | 7/2011 | Stasky | B62J 6/027 315/77 |
| 2012/0320612 A1 * | 12/2012 | Yamakura | B62J 6/055 280/281.1 |
| 2013/0015219 A1 * | 1/2013 | Zuraski | E05B 67/38 224/450 |
| 2013/0307678 A1 * | 11/2013 | Ransom | B62J 6/056 340/474 |
| 2014/0092612 A1 * | 4/2014 | Freiser | B62J 6/045 362/486 |
| 2016/0068215 A1 * | 3/2016 | Kunisada | B62J 11/13 74/551.8 |
| 2016/0083034 A1 * | 3/2016 | St-Gallay | B62H 5/001 224/412 |
| 2016/0257365 A1 * | 9/2016 | Chiu | B62J 6/16 |
| 2020/0189678 A1 * | 6/2020 | Phillip | B62J 6/045 |

* cited by examiner

HELMET LOCKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to locking devices and more particularly pertains to a new locking device for securely storing motorcycle helmets on a motorcycle.

(2) Description of Related Art Including Information Disclosed Under 37 CFR 1.97 and 1.98

The prior art relates to locking devices.

BRIEF SUMMARY OF THE INVENTION

An embodiment of the disclosure meets the needs presented above by generally comprising a mounting unit that is coupled to a motorcycle. A pair of locking units is each coupled to the mounting unit. Each of the locking units releasably engages a respective one of a plurality of motorcycle helmets for retaining the motorcycle helmets on the motorcycle. A pair of turn signals is coupled to the mounting unit. Each of the turn signals is turned on when respective ones of the motorcycle turn indicators is turned on. A plurality of light emitters is coupled to the mounting unit. Each of the light emitters is turned on when tail lights or brake lights of the motorcycle are turned on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
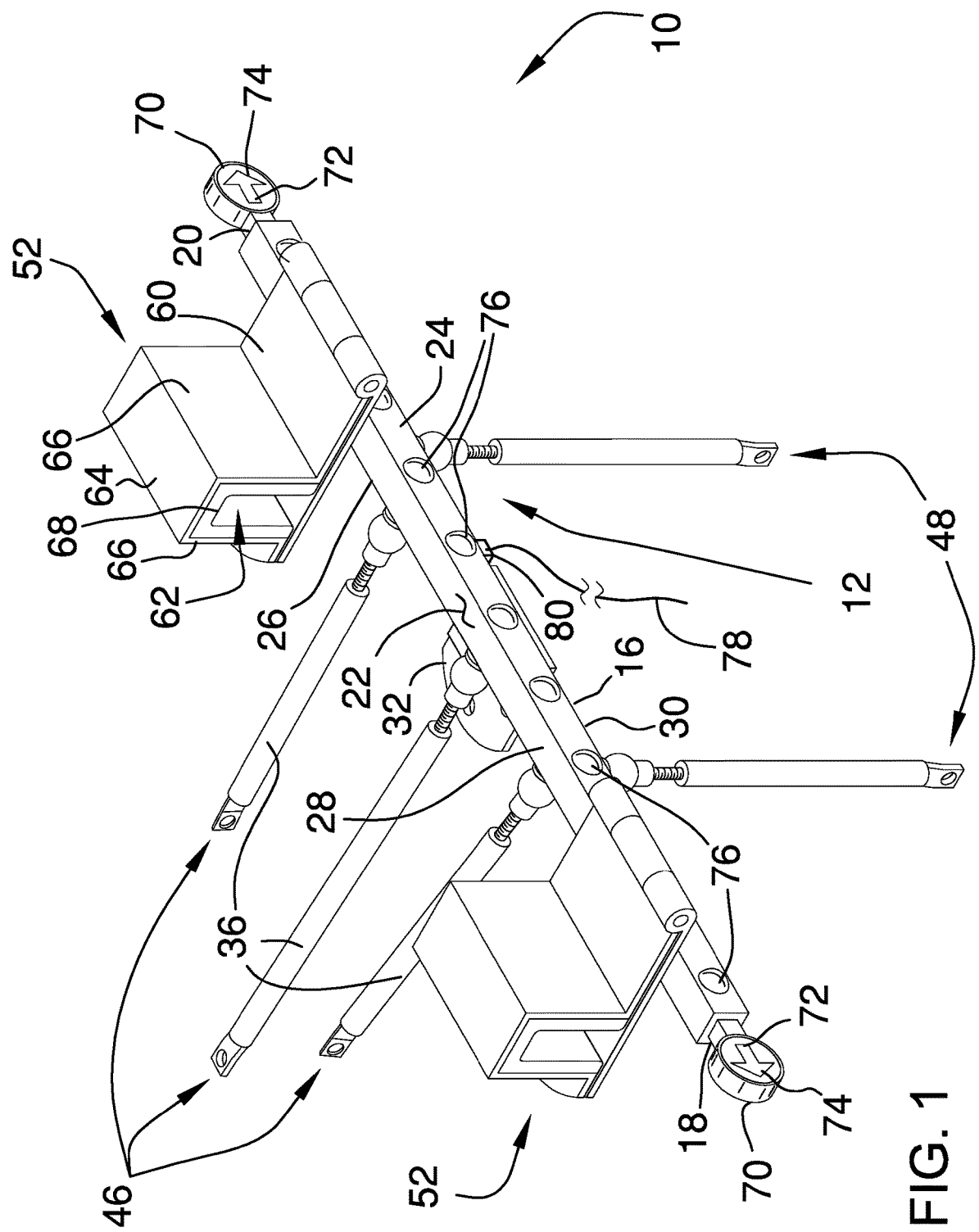
FIG. 1 is a perspective view of a helmet locking assembly according to an embodiment of the disclosure.
Figure 2:
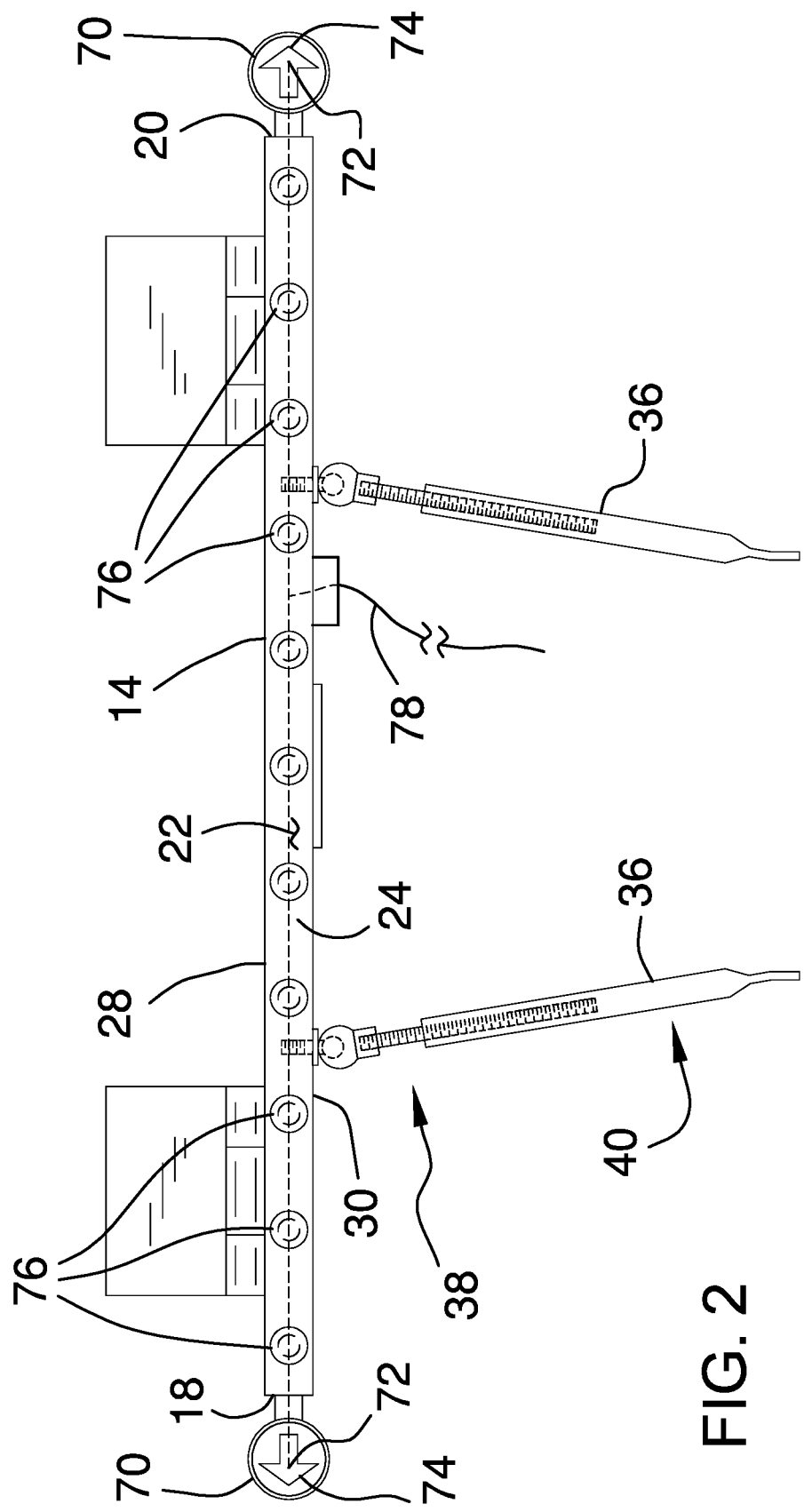
FIG. 2 is a back view of an embodiment of the disclosure.
Figure 3:
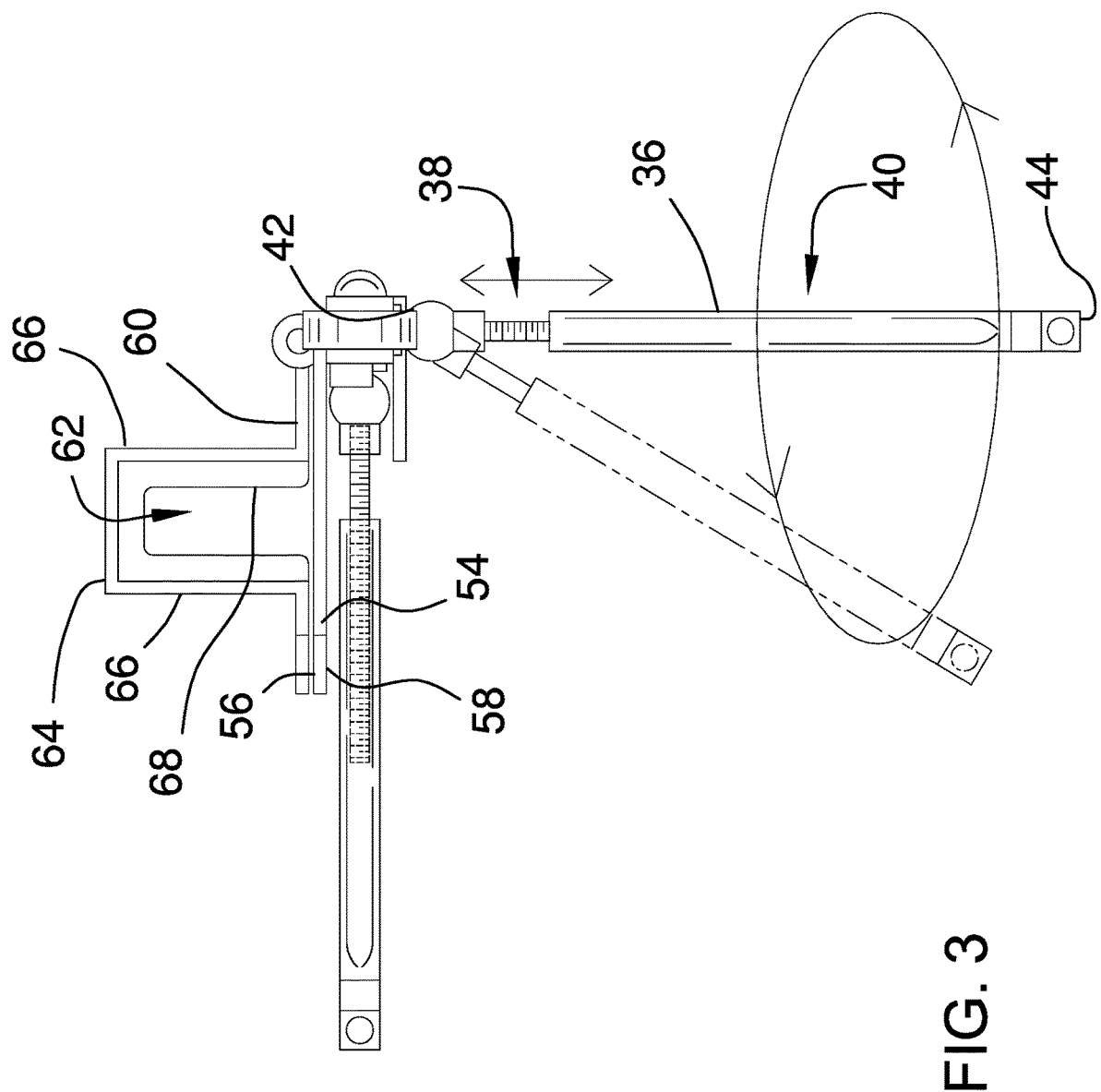
FIG. 3 is a right side view of an embodiment of the disclosure.
Figure 4:
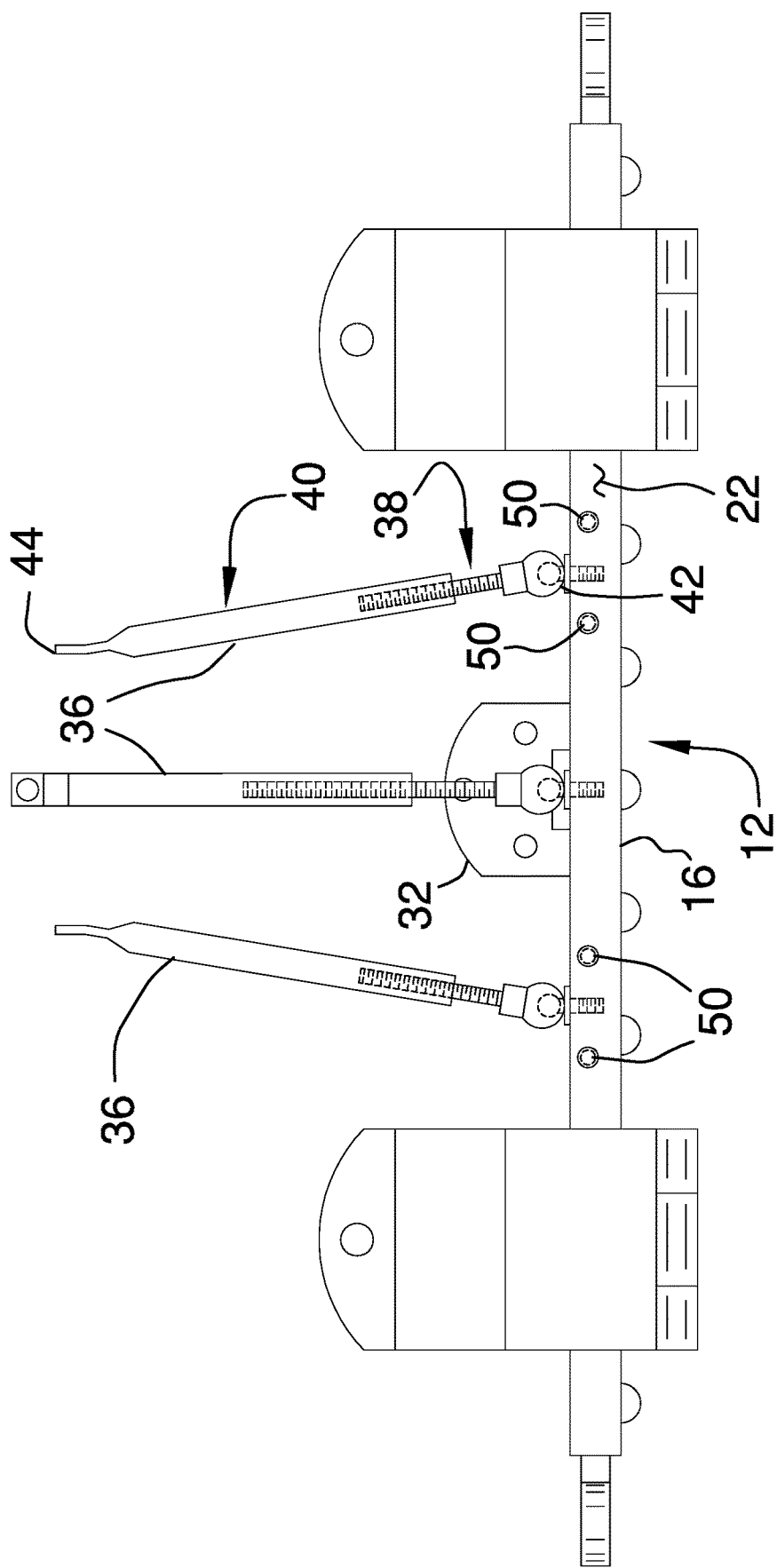
FIG. 4 is a top view of an embodiment of the disclosure.
Figure 5:
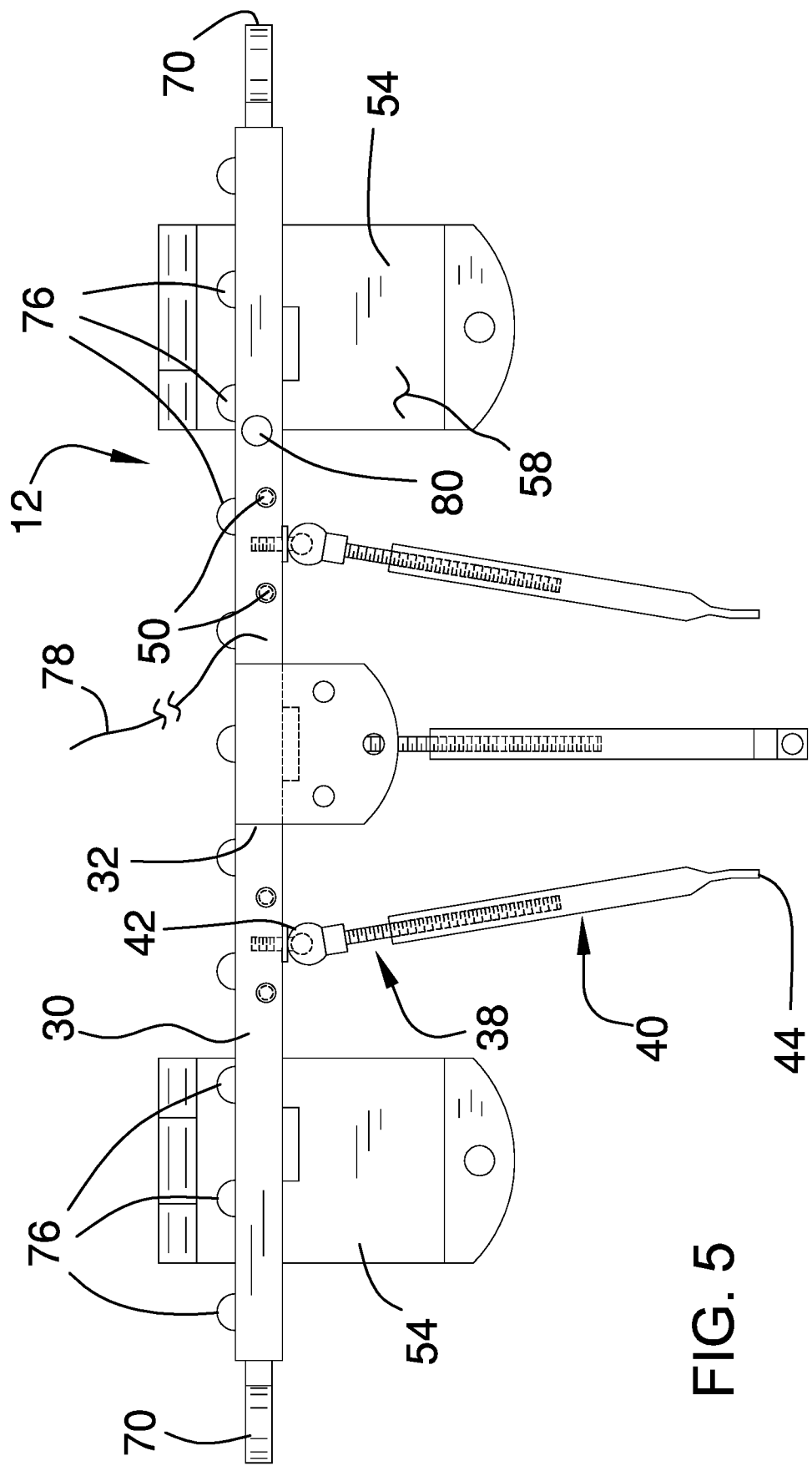
FIG. 5 is a bottom view of an embodiment of the disclosure.
Figure 7:
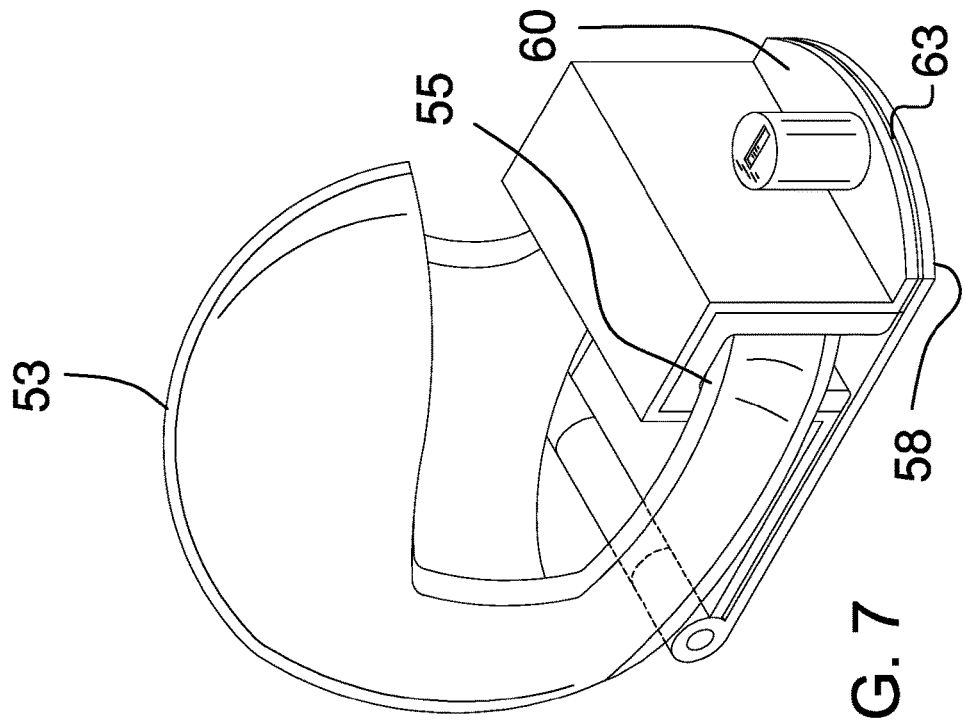
FIG. 7 is an in-use view of a clamp of an embodiment of the disclosure.
Figure 6:
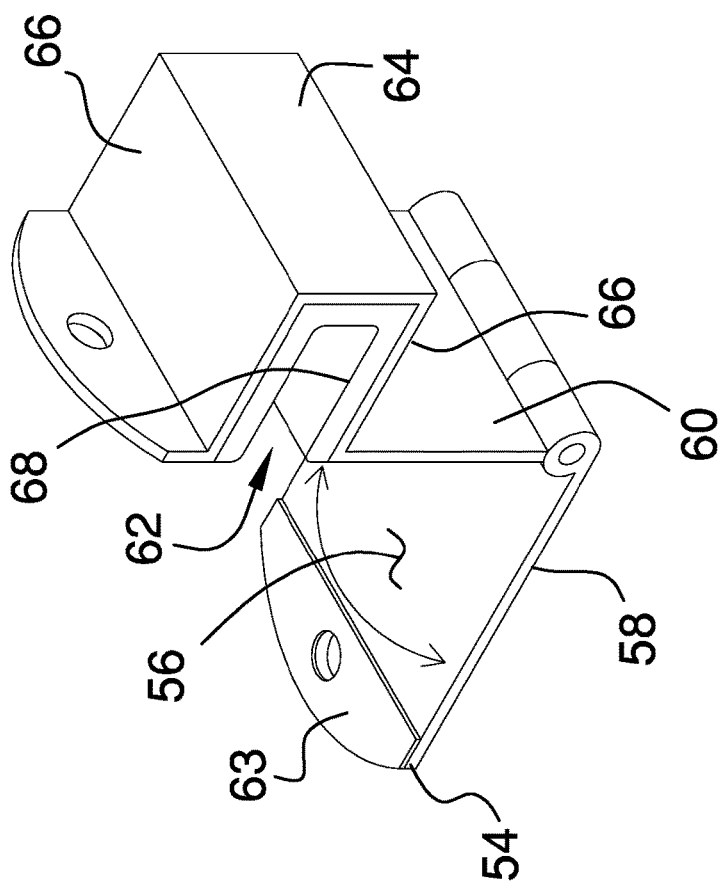
FIG. 6 is a perspective view of a clamp of an embodiment of the disclosure.
Figure 8:
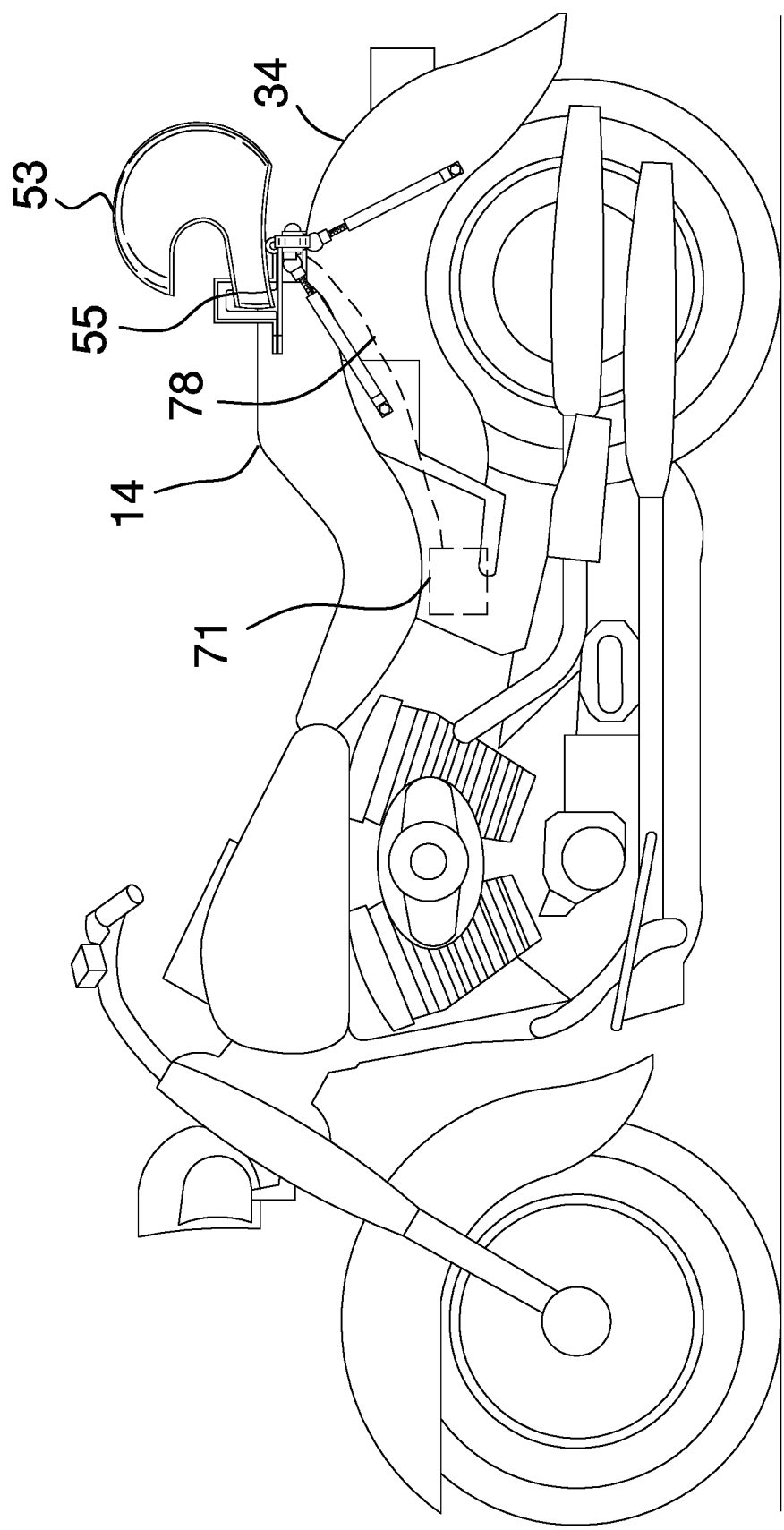
FIG. 8 is a left side in-use view of an embodiment of the disclosure.
Figure 9:
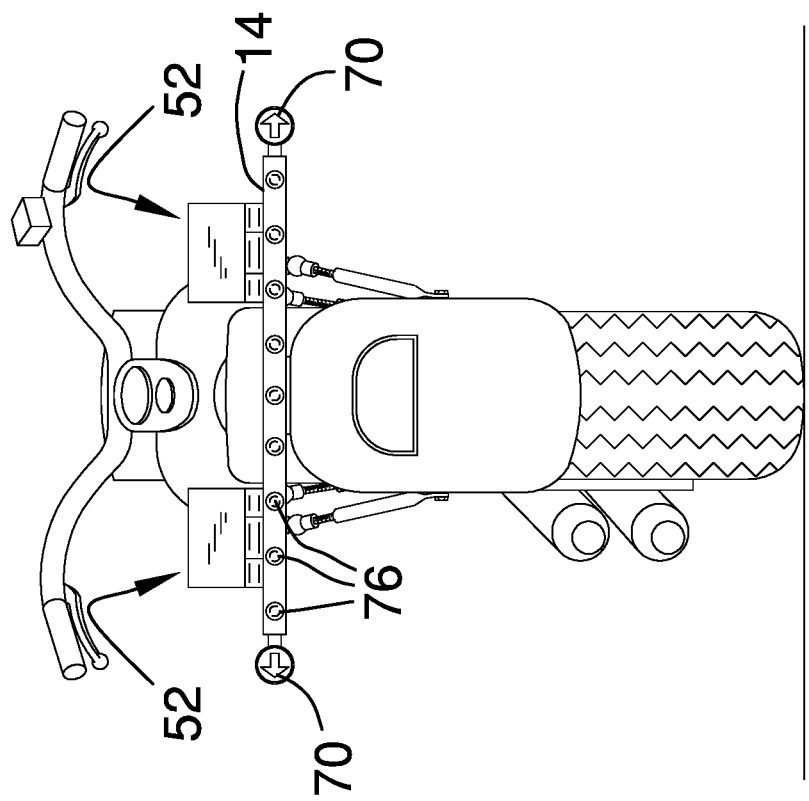
FIG. 9 is a back in-use view of an embodiment of the disclosure.

With reference now to the drawings, and in particular to FIGS. 1 through 9 thereof, a new locking device embodying the principles and concepts of an embodiment of the disclosure and generally designated by the reference numeral 10 will be described.

As best illustrated in FIGS. 1 through 9, the helmet locking assembly 10 generally comprises a mounting unit 12 that is coupled to a motorcycle 14. The mounting unit 12 comprises a bar 16 that has a first end 18, a second end 20 and an outer surface 22 extending therebetween. The outer surface 22 has a back side 24, a front side 26, a top side 28 and a bottom side 30. A mount 32 is coupled to and extends away from the bar 16 and the mount 32 is coupled to a rear fender 34 on the motorcycle 14. Additionally, the bar 16 is horizontally oriented when the mount 32 is coupled to the rear fender 34.

A plurality of stabilizers 36 is each pivotally coupled to the bar 16. Each of the stabilizers 36 has a first portion 38 that movably engages a second portion 40 such that each of the stabilizers 36 has a telescopically adjustable length. The first portion 38 may threadably engage the second portion 40 for lengthening or shortening the stabilizers 36. The first portion 38 of each of the stabilizers 36 has a first end 42 and the second portion 40 of each of the stabilizers 36 has a primary end 44. The first end 42 of the first portion 38 of each of the stabilizers 36 is pivotally coupled to the outer surface 22 of the bar 16. The primary end 44 of the second portion 40 of each of the stabilizers 36 is coupled to strategic locations on the motorcycle 14.

The plurality of stabilizers 36 includes a set of first stabilizers 46 and a set of second stabilizers 48. Each of the first stabilizers 46 is positioned on the front side 26 of the outer surface 22 of the bar 16. Additionally, each of the second stabilizers 48 is positioned on the bottom side 30 of the outer surface 22 of the bar 16. The bar 16 has a plurality of engagement points 50 and the engagement points 50 are distributed between the first end 18 and the second end 20 of the bar 16. The first end 18 of the first portion 38 of each of the stabilizers 36 can be coupled to any of the engagement points 50 for fitment to a variety of makes and models of motorcycles.

A pair of locking units 52 is each coupled to the mounting unit 12. Each of the locking units 52 engages a respective one of a plurality of motorcycle helmets 53 for retaining the motorcycle helmets 53 on the motorcycle 14. Each of the locking units 52 is positioned on the bar 16. Additionally, each of the locking units 52 is positioned adjacent to a respective one of the first end 18 and the second end 20 of the bar 16.

Each of the locking units 52 comprises a plate 54 that has a top surface 56 and a bottom surface 58. The bottom surface 58 is coupled to the top side 28 of the outer surface 22 of the bar 16. Each of the locking units 52 includes a clamp 60 that is pivotally coupled to the plate 54. The clamp 60 has a helmet channel 62 therein for receiving the chin bar 55 of the motorcycle helmet 53. The clamp 60 is positionable in a closed position for securing the motorcycle helmet 53 on the motorcycle 14. In this way the clamp 60 inhibits the motorcycle helmet 53 from being stolen. The clamp 60 is positionable in an open position for removing the motorcycle helmet 53 from the clamp 60.

The clamp 60 has a middle portion 64 extending between a pair of upright portions 66 to define the helmet channel 62 between the upright portions 66. The middle portion 64 is spaced from the plate 54 when the clamp 60 is in the closed position. Moreover, the clamp 60 is biased into the closed position. A pad 68 is coupled to the clamp 60 and the pad 68 extends along each of the upright portions 66 and the middle portion 64. The pad 68 cushions the chin bar 55 of the motorcycle helmet 53 when the clamp 60 is in the closed position.

The clamp 60 might include a keyed lock, a bolt to engage the plate 54 or other means of retaining the clamp 60 in the closed position. A tab 69 extends forwardly from a respective one of the upright portions 66 of the clamp 60 for receiving they keyed lock or the bolt. The tab abuts the top surface 56 of the plate when the clamp is in the closed position. As is most clearly shown in FIGS. 6 and 7, a cushion 63 may be coupled to the top surface 56 of the plate 54 for absorbing vibrations between the tab 69 and the plate 54.

A pair of turn signals 70 is each coupled to the mounting unit 12 and each of the turn signals 70 is electrically coupled to an electrical system 71 of the motorcycle 14. Each of the turn signals 70 is turned on when respective ones of the motorcycle 14 turn indicators is turned on to indicate turns to oncoming traffic. Each of the turn signals 70 is positioned on a respective one of the first end 18 and the second end 20 of the bar 16. Additionally, each of the turn signals 70 includes a light emitter 72 that is electrically coupled to the electrical system of the motorcycle 14. Each of the turn signals 70 may have an arrow shaped lens 74 that is pointed in the direction corresponding to each of the turn signals 70.

A plurality of light emitters 76 is each coupled to the mounting unit 12 and each of the light emitters 76 emits light outwardly from the mounting unit 12. Each of the light emitters 76 is electrically coupled to the electrical system 71 of the motorcycle 14. Each of the light emitters 76 is turned on when tail lights or brake lights of the motorcycle 14 are turned on. Additionally, each of the light emitters 76 is positioned on the back side 24 of the outer surface 22 of the bar 16. The light emitters 76 are spaced apart from each other and are distributed between the first end 18 and the second end 20 of the bar 16. Each of the light emitters 76 may comprise an LED or the like. A wiring harness 78 is electrically coupled to the turn signals 70 and the plurality of light emitters 76 for making electrical connections with the electrical system 71 of the motorcycle 14. A connection plug 80 is coupled to the bar 16 and the connection plug is electrically coupled to each of the turn signals 70 and each of the light emitters 76. The wiring harness 78 is removably coupled to the connection plug 80 to facilitate the wiring harness to be removed from the bar 16.

In use, the mount 32 is coupled to the rear fender 34 of the motorcycle 14. Each of the stabilizers 36 is adjusted to the desired length and each of the stabilizers 36 is coupled to the strategic locations on the motorcycle 14. In this the bar 16 can be positioned at and retained at the horizontal orientation. Each of the turn signals 70 is turned on when the respective turn indicator on the motorcycle 14 is turned on. Additionally, each of the light emitters 76 is turned on when the tail light or brake light is turned on. The clamp 60 on each of the locking units 52 can be closed over the chin bar 55 of the respective motorcycle helmet 53. In this way a plurality of motorcycle helmets 53 can be stored and secured on the motorcycle 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A helmet locking assembly being configured to be mounted to a motorcycle thereby facilitating motorcycle helmets to be securely stored, said assembly comprising:
   a mounting unit being coupled to a motorcycle;
   a pair of locking units, each of said locking units being coupled to said mounting unit, each of said locking units releasably engaging a respective one of a plurality of motorcycle helmets for retaining the motorcycle helmets on the motorcycle;
   a pair of turn signals, each of said turn signals being coupled to said mounting unit, each of said turn signals being electrically coupled to an electrical system of the motorcycle, each of said turn signals being turned on when respective ones of the motorcycle turn indicators is turned on wherein each of said turn signals is configured to indicate turns to oncoming traffic;
   a plurality of light emitters, each of said light emitters being coupled to said mounting unit wherein each of said light emitters is configured to emit light outwardly from said mounting unit, each of said light emitters being electrically coupled to the electrical system of the motorcycle, each of said light emitters being turned on when tail lights or brake lights of the motorcycle are turned on; and wherein said mounting unit comprises
  a bar having a first end, a second end and an outer surface extending therebetween, said outer surface having a back side, a front side, a top side and a bottom side,
  a mount being coupled to and extending away from said bar, said mount being coupled to a rear fender on the motorcycle for retaining said bar on the motorcycle, said bar being horizontally oriented when said mount is coupled to the rear fender, and
  a plurality of stabilizers, each of said stabilizers being pivotally coupled to said bar, each of said stabilizers having a first portion movably engaging a second portion such that each of said stabilizers has a telescopically adjustable length.

2. The assembly according to claim 1, wherein said first portion of each of said stabilizers has a first end, said second portion of each of said stabilizers having a primary end, said first end of said first portion of each of said stabilizers being pivotally coupled to said outer surface of said bar, said primary end of said second portion of each of said stabilizers being coupled to strategic locations on the motorcycle.

3. The assembly according to claim 2, wherein said plurality of stabilizers includes a set of first stabilizers and a set of second stabilizers, each of said first stabilizers being positioned on said front side of said outer surface of said bar, each of said second stabilizers being positioned on said bottom side of said outer surface of said bar.

4. The assembly according to claim 1, wherein each of said locking units is positioned on said bar, each of said locking units being positioned adjacent to a respective one of said first end and said second end of said bar.

5. The assembly according to claim 4, wherein each of said locking units comprises a plate having a top surface and a bottom surface, said bottom surface being coupled to said top side of said outer surface of said bar.

6. The assembly according to claim 5, wherein each of said locking units includes a clamp being pivotally coupled to said plate, said clamp having a helmet channel therein for receiving a chin bar of a motorcycle helmet, said clamp being positionable in a closed position for securing the motorcycle helmet on the motorcycle wherein said clamp is configured to inhibit the motorcycle helmet from being stolen, said clamp being positionable in an open position for removing the motorcycle helmet from said clamp.

7. The assembly according to claim 6, wherein said clamp has a middle portion extending between a pair of upright portions to define said helmet channel between said upright portions, said middle portion being spaced from said plate when said clamp is in said closed position, said clamp being biased into said closed position.

8. The assembly according to claim 1, wherein each of said turn signals is positioned on a respective one of said first end and said second end of said bar, each of said turn signals including a light emitter being electrically coupled to the electrical system of the motorcycle.

9. The assembly according to claim 1, wherein each of said light emitters being positioned on said back side of said outer surface of said bar, said light emitters being spaced apart from each other and being distributed between said first end and said second end of said bar.

10. A helmet locking assembly being configured to be mounted to a motorcycle thereby facilitating motorcycle helmets to be securely stored, said assembly comprising:
  a mounting unit being coupled to a motorcycle, said mounting unit comprising:
    a bar having a first end, a second end and an outer surface extending therebetween, said outer surface having a back side, a front side, a top side and a bottom side;
    a mount being coupled to and extending away from said bar, said mount being coupled to a rear fender on the motorcycle for retaining said bar on the motorcycle, said bar being horizontally oriented when said mount is coupled to the rear fender; and
    a plurality of stabilizers, each of said stabilizers being pivotally coupled to said bar, each of said stabilizers having a first portion movably engaging a second portion such that each of said stabilizers has a telescopically adjustable length, said first portion of each of said stabilizers having a first end, said second portion of each of said stabilizers having a primary end, said first end of said first portion of each of said stabilizers being pivotally coupled to said outer surface of said bar, said primary end of said second portion of each of said stabilizers being coupled to strategic locations on the motorcycle, said plurality of stabilizers including a set of first stabilizers and a set of second stabilizers, each of said first stabilizers being positioned on said front side of said outer surface of said bar, each of said second stabilizers being positioned on said bottom side of said outer surface of said bar;
  a pair of locking units, each of said locking units being coupled to said mounting unit, each of said locking units engaging a respective one of a plurality of motorcycle helmets for retaining the motorcycle helmets on the motorcycle, each of said locking units being positioned on said bar, each of said locking units being positioned adjacent to a respective one of said first end and said second end of said bar, each of said locking units comprising:
    a plate having a top surface and a bottom surface, said bottom surface being coupled to said top side of said outer surface of said bar; and
    a clamp being pivotally coupled to said plate, said clamp having a helmet channel therein for receiving a chin bar of a motorcycle helmet, said clamp being positionable in a closed position for securing the motorcycle helmet on the motorcycle wherein said clamp is configured to inhibit the motorcycle helmet from being stolen, said clamp being positionable in an open position for removing the motorcycle helmet from said clamp, said clamp having a middle portion extending between a pair of upright portions to define said helmet channel between said upright portions, said middle portion being spaced from said plate when said clamp is in said closed position, said clamp being biased into said closed position;
  a pair of turn signals, each of said turn signals being coupled to said mounting unit, each of said turn signals being electrically coupled to an electrical system of the motorcycle, each of said turn signals being turned on when respective ones of the motorcycle turn indicators is turned on wherein each of said turn signals is configured to indicate turns to oncoming traffic, each of said turn signals being positioned on a respective one of said first end and said second end of said bar, each of said turn signals including a light emitter being electrically coupled to the electrical system of the motorcycle; and a plurality of light emitters, each of said light emitters being coupled to said mounting unit wherein each of said light emitters is configured to emit light outwardly from said mounting unit, each of said light emitters being electrically coupled to the electrical system of the motorcycle, each of said light emitters being turned on when tail lights or brake lights of the motorcycle are turned on, each of said light emitters being positioned on said back side of said outer surface of said bar, said light emitters being spaced apart from each other and being distributed between said first end and said second end of said bar.

* * * * *